US007561725B2

(12) United States Patent
Liang

(10) Patent No.: US 7,561,725 B2
(45) Date of Patent: Jul. 14, 2009

(54) IMAGE SEGMENTATION IN A THREE-DIMENSIONAL ENVIRONMENT

(75) Inventor: Cheng-Chung Liang, West Windsor, NJ (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 677 days.

(21) Appl. No.: 10/796,864

(22) Filed: Mar. 9, 2004

(65) Prior Publication Data

US 2005/0018902 A1 Jan. 27, 2005

Related U.S. Application Data

(60) Provisional application No. 60/454,117, filed on Mar. 12, 2003.

(51) Int. Cl.
*G06K 9/00* (2006.01)

(52) U.S. Cl. ........................ 382/128; 382/173
(58) Field of Classification Search ............... 382/173, 382/128
See application file for complete search history.

(56) References Cited

U.S. PATENT DOCUMENTS

| 5,264,836 | A * | 11/1993 | Rubin ................... 345/157 |
| 5,956,418 | A * | 9/1999 | Aiger et al. ............. 382/154 |
| 6,434,260 | B1 * | 8/2002 | Soferman et al. ......... 382/131 |
| 6,468,218 | B1 * | 10/2002 | Chen et al. .............. 600/443 |
| 7,031,505 | B2 * | 4/2006 | Accomazzi .............. 382/131 |
| 2003/0012419 | A1 * | 1/2003 | Accomazzi .............. 382/131 |
| 2003/0103682 | A1 * | 6/2003 | Blake et al. ............. 382/282 |
| 2004/0170311 | A1 * | 9/2004 | Accomazzi .............. 382/131 |

OTHER PUBLICATIONS

Marianna Jakab and Mark Anderson: "A Practical Guide to the 3D Slicer" Online: Feb. 2001, XP002290128 Retrieved from the Internet: URL: http://spl.bwh.harvard.edu:8000/pages/papers/slicer/manual/slicerl_manual.htm> retrieved on Jul. 27, 2004: the whole document.*
David T. Gering: "A System for Surgical Planning and Guidance using Image Fusion and Interventional MR" Thesis: Massachusetts Institute of Technology 1999.*
Screenshot and source code of http://web.archive.org/web/20010920135022/http://slicer.ai.mit.edu/index.html showing link to http://spl.bwh.harvard.edu:8000/pages/papers/slicer/manuals/slicer_manual.htm archived on Sep. 9, 2001.*

(Continued)

*Primary Examiner*—Matthew C. Bella
*Assistant Examiner*—Sath V. Perungavoor
(74) *Attorney, Agent, or Firm*—Donald B. Paschburg; F. Chau & Associates, LLC

(57) ABSTRACT

A method (100) for image segmentation in a three-dimensional environment includes receiving scan data (112), selecting a viewing vector relative to the scan data (114), rendering the scan data as a 3D image about the viewing vector (116), displaying the rendered 3D image (118), selecting a range of 2D image slices within the 3D image (122), performing 2D segmentation on the selected slices relative to the viewing vector to obtain a segmented 3D object (124), and displaying the segmented 3D object (128).

40 Claims, 6 Drawing Sheets

OTHER PUBLICATIONS

O'Donnell, L., "Semi-Automatic Medical Image Segmentation", Master's Thesis, MIT, 2001.*

Marianna Jakab and Mark Anderson: "A Practical Guide to the 3D Slicer"Online! Feb. 2001, XP002290128 Retrieved from the Internet: URL:http://spl .bwh.harvard.edu:8000/pages/ papers/ slicer/manual/slicer/_manual.htm> 'retrieved on Jul. 27, 2004! the whole document.

Liang J et al: "United Snakes Yimage analysis software" Computer Vision, 1999. The Proceedings of the Seventh IEEE International Conference on Kerkyra, Greece Sep. 20-27, 1999, Los Alamitos, CA, USA, IEEE Comput. Soc, US, Sep. 20, 1999, pp. 933-940, XP010350529 ISBN: 0-7695-0164-8 the whole document.

* cited by examiner

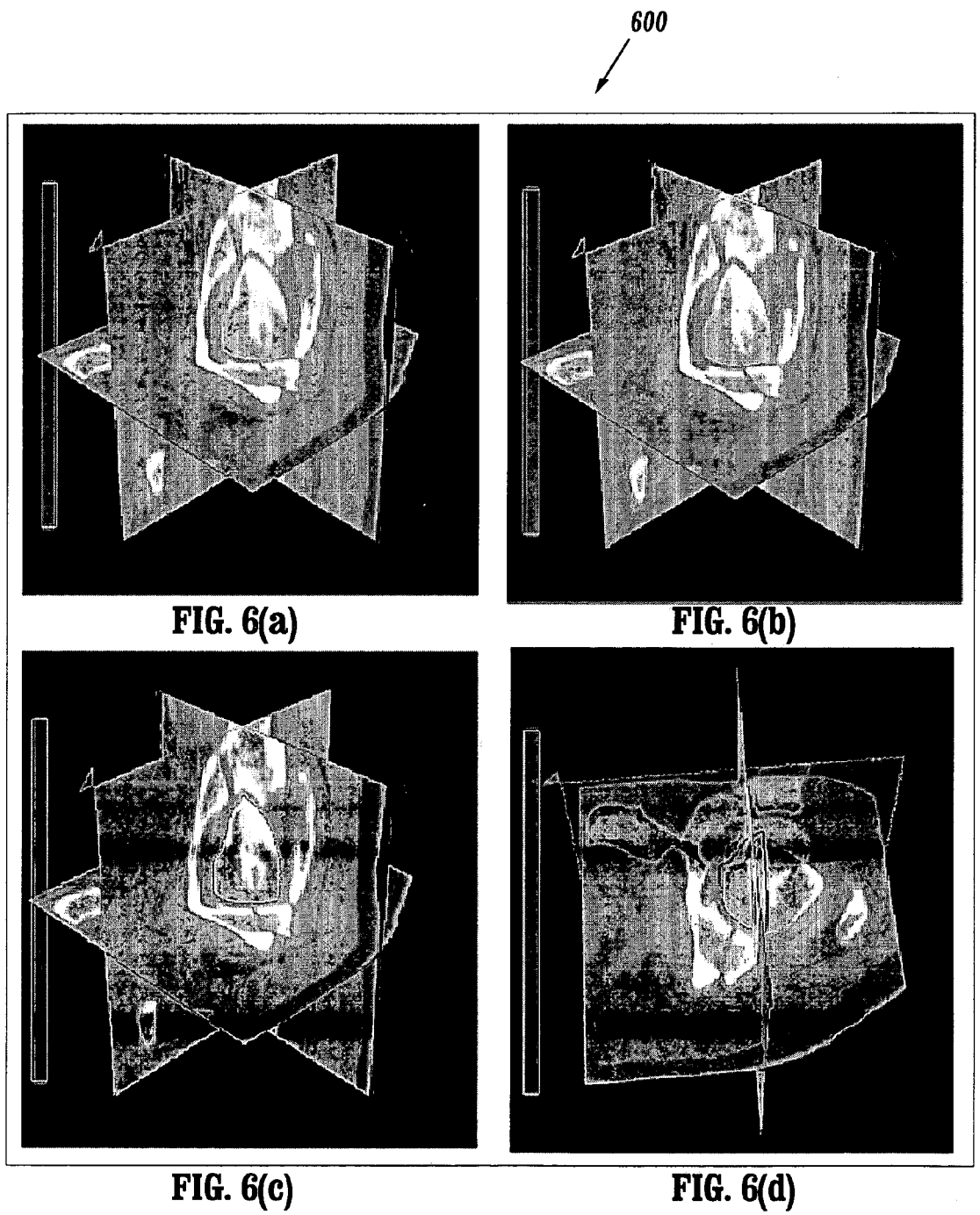
FIG. 6(a)  FIG. 6(b)
FIG. 6(c)  FIG. 6(d)

IMAGE SEGMENTATION IN A THREE-DIMENSIONAL ENVIRONMENT

CROSS-REFERENCE TO RELATED APPLICATION

This application claims the benefit of U.S. Provisional Application Ser. No. 60/454,117, filed Mar. 12, 2003 and entitled "Livewire tool in 3D Environment", which is incorporated herein by reference in its entirety.

BACKGROUND

Medical image data, for example, is typically obtained in the form of slices through various types of imaging modalities. These slices are then stacked to form a three-dimensional ("3D") volume. To extract a 3D region of interest from a 3D volumetric data set is still a challenging task. The main difficulty is that there is no robust automatic algorithm that can handle all the different situations and applications. When automatic methods fall short, expert human intervention is generally required for extracting desired areas or regions of interest.

Working on 2D slices is one way to explore the 3D volume from medical imaging modalities. An interactive 2D-segmentation tool, which has been referred to as an intelligent scissors, facilitates user delineation of 2D regions of interest. Although an intelligent scissors is a very convenient tool for a 2D slice, it is not very appealing if a user needs to go through hundreds or thousands of slices. Sometimes significant features are not revealed in the direction of the original scanned slices, but show more clearly in other directions. It would be beneficial for user interactive efficiency and shape fidelity if the user had tools to outline the significant features along that more revealing direction.

To accommodate this kind of approach, there should be a way for users to switch the slices to any arbitrary direction or angle and outline region of interest. The interface of most of the current medical image systems is based on several view windows of 2D images that slice through the 3D volume in different directions. This interface is usually accompanied by a 3D view window that can visualize the 3D results of the operations, but which has no editing capability. This kind of working environment is generally awkward because the user needs to jump back-and-forth between the 3D view and the 2D views, and has to mentally correlate the current 2D slices in the 3D space.

Accordingly, what is needed is a system and method capable of permitting users to apply 2D segmentation tools on 2D slices directly in a 3D environment. The present disclosure addresses these and other issues.

SUMMARY

These and other drawbacks and disadvantages of the prior art are addressed by an apparatus and method for image segmentation in a three-dimensional environment.

A method, apparatus and program storage device for image segmentation in a three-dimensional environment are provided for receiving scan data, selecting a viewing vector relative to the scan data, rendering the scan data as a 3D image about the viewing vector, displaying the rendered 3D image, selecting a range of 2D image slices within the 3D image, performing 2D segmentation on the selected slices relative to the viewing vector to obtain a segmented 3D object, and displaying the segmented 3D object.

These and other aspects, features and advantages of the present disclosure will become apparent from the following description of exemplary embodiments, which is to be read in connection with the accompanying drawings.

BRIEF DESCRIPTION OF THE DRAWINGS

The present disclosure teaches an apparatus and method for image segmentation in a three-dimensional environment, in accordance with the following exemplary figures, in which:

FIG. 6 shows graphical diagrams of 2D segmentation in the optional 2½ D mode in accordance with FIG. 1.

DETAILED DESCRIPTION OF PREFERRED EMBODIMENTS

Figure 1:
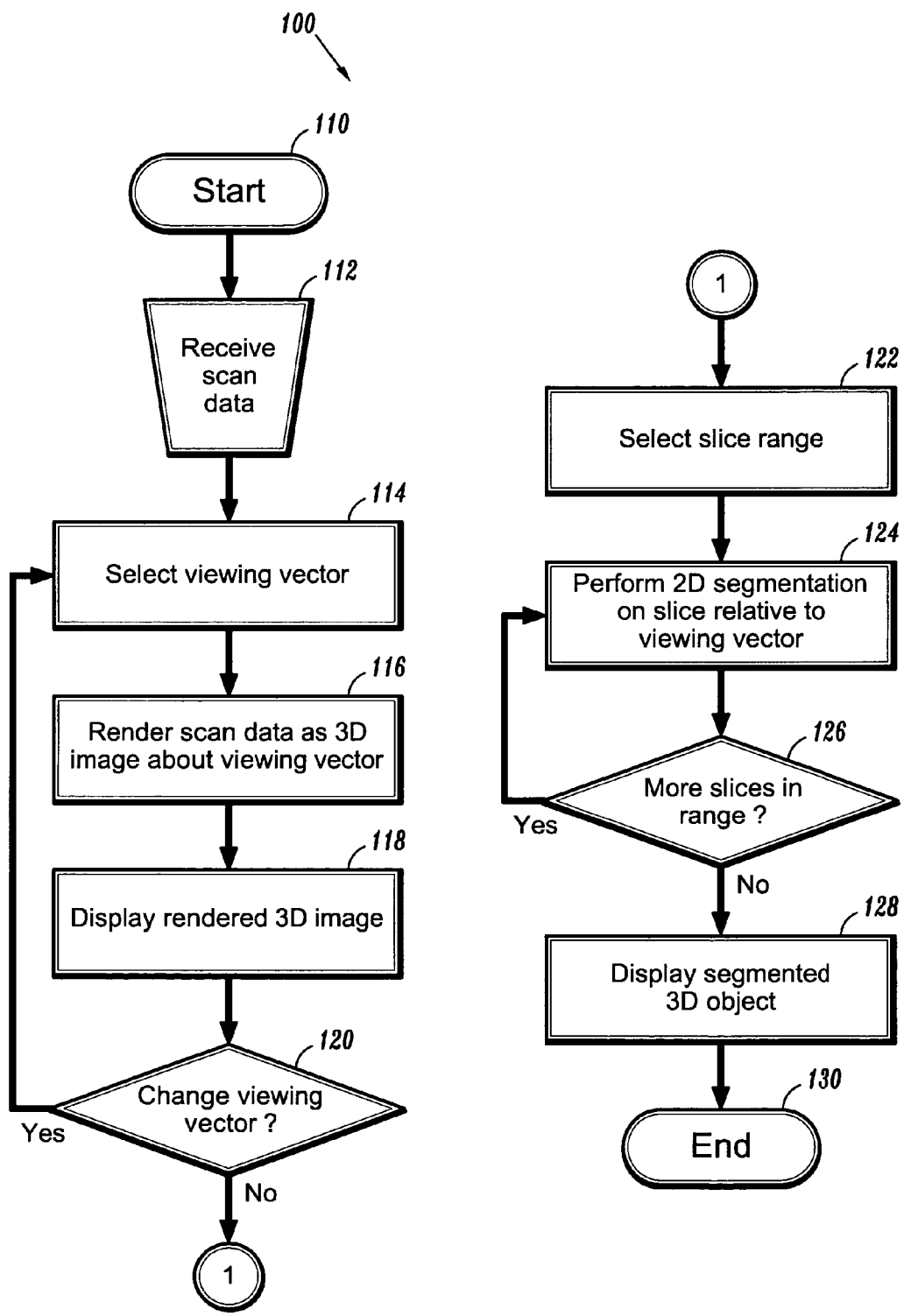
FIG. 1 shows a flowchart for image segmentation in a three-dimensional environment in accordance with an illustrative embodiment of the present disclosure.

To extract a three-dimensional ("3D") region of interest from a stack of medical scan slices has been a challenging task. The main difficulty is that there is no robust automatic algorithm that can handle all the different situations and applications. Human intervention is usually unavoidable for extracting desired area or organs. However, without convenient tools, it is a tedious job for human beings to go through the large numbers of slices involved. Embodiments of the present disclosure apply a powerful two-dimensional ("2D") image segmentation tool, herein referred to as "livewire", directly in the 3D environment. This arrangement provides users with the tools to more efficiently extract 3D regions of interest.

Preferred embodiments of the present disclosure provide a system in which users can apply the livewire tool on 2D slices directly in a 3D environment. Thus, users can draw regions of interest directly on a 3D view instead of on a separate 2D view, thereby eliminating the burden of switching between a 3D view and 2D views. In this 3D view, several 2D slices can be rendered together so that users can get a better sense of the 3D space. This 3D environment is also designed to let users switch the working slice easily so that they can extract the salient features of the data in a reduced amount of time. The exemplary description that follows provides a livewire tool, a 3D working environment, and integration of the livewire tool into the 3D working environment.

The basic working scenario of the livewire tool is that a user selects an anchor point on an image, and then freely moves the mouse to other positions on the image. The livewire tool automatically provides a path from the anchor point to the current mouse position. This path generally falls at the borders of regions inside the image, which is usually what user desires, thereby eliminating the need for very careful drawing by the user along the boundaries. Since the path changes according to the movement of the mouse position, it looks like the wire is active. Accordingly, the term "livewire" is coined to describe this tool. Users can fix a portion of the path by clicking a new anchor point. By clicking just a few anchor points, users can outline a very complicated shape from the image.

The underlying algorithm for livewire finds the boundary definition via dynamic programming, and formulates it as a graph-searching problem. The goal is to find the optimal path between a start node and a set of goal nodes. The optimality is defined as the minimum cumulative cost path from a start point to a goal point. The cumulative cost of a path is the sum of local edge costs on the path.

In an exemplary embodiment, a manual overwriting mechanism is integrated into the livewire tool. During a livewire drawing session, a user can drag the mouse (that is, move the mouse while pressing a mouse button) to draw the curve without livewire activated at some troublesome area. When the user releases the button, the livewire tool is turned back on. In this way, a user can draw a contour very quickly using the combination of livewire and free-hand drawing without the need to press other GUI buttons to switch the automatic mode on and off, for example.

The basic behavior of an exemplary 3D working environment compares favorably with many advanced 3D visualization packages or workstations. Basically, the 3D working environment has three orthogonal slices that divide the 3D space into eight sections. Hence, this view is referred to as an Octant View ("OV").

As shown in FIG. 1, a flowchart for image segmentation in a three-dimensional environment is indicated generally by the reference numeral 100. The flowchart 100 includes a start block 110 leading to an input block 112 for receiving scan data. The input block 112 leads to a function block 114 for selecting a viewing vector. The function block 114, in turn, leads to a function block 116 for rendering the scan data as a 3D image about the viewing vector. The function block 116 leads to a function block 118 for displaying the rendered 3D image to a user. The function block 118, in turn, leads to a decision block 120 for changing the viewing vector. If the viewing vector is to be changed, control is passed back to the function block 114.

If the viewing vector remains the same, the decision block 120 passes control to a function block 122 for selecting a slice range. The function block 122 leads to a function block 124 for performing 2D segmentation on the current slice relative to the viewing vector. The function block 124, in turn, passes control to a decision block 126 for determining whether there are more slices left in the selected slice range. If there are more slices, control is passed back to the function block 124. However, if all slices from the selected range have been segmented, control is passed to a function block 128 for displaying the segmented 3D object. The function block 128, in turn, passes control to an end block 130.

Figure 2:
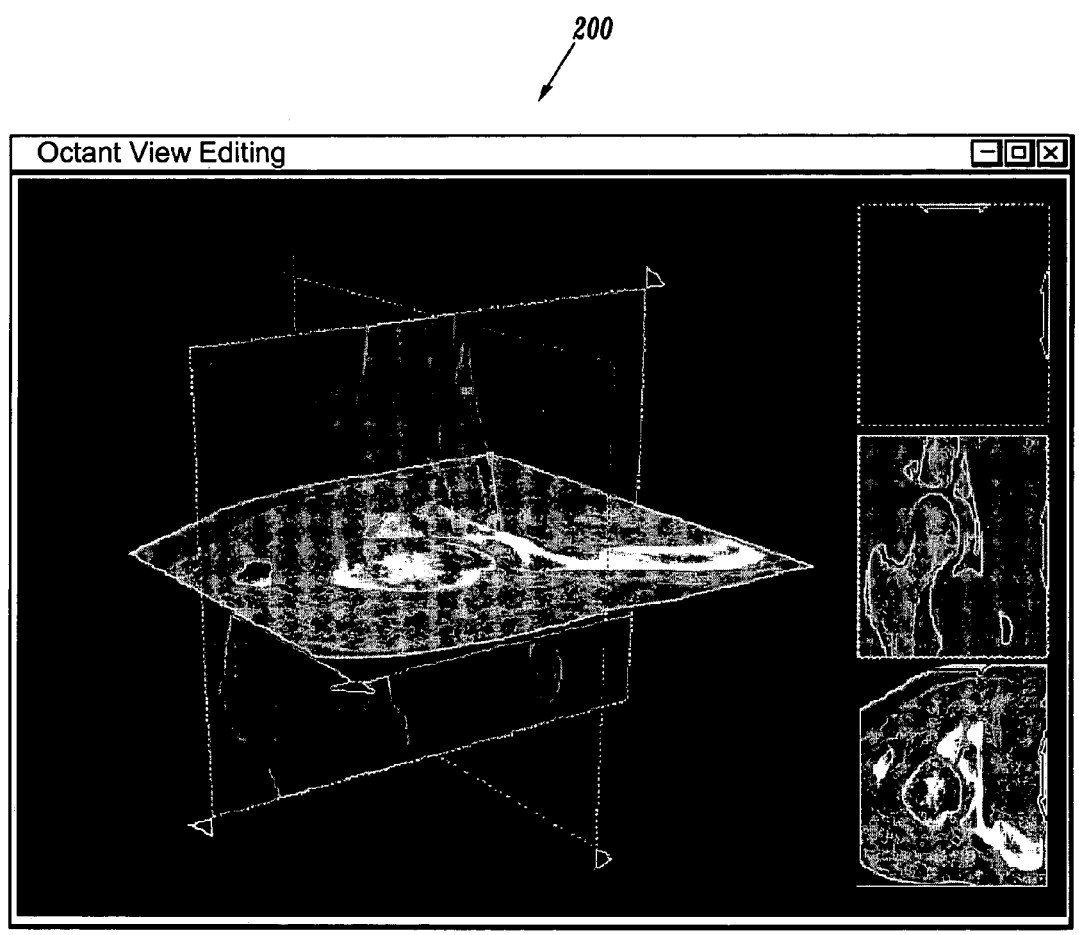
FIG. 2 shows a graphical diagram of a 3D rendered octant view in accordance with FIG. 1.

Turning to FIG. 2, an octant view screen shot is indicated generally by the reference numeral 200. Here, the OV provides three orthogonal planes with each one perpendicular to one of the coordinate axis. Each plane has three display modes: active, inactive, and invisible. When a plane is in the active mode, the appearance is a gray scale image accompanied by a full bright border. When a plane is in inactive mode, the appearance is a transparent image together with a dashed border. When a plane is in the invisible mode, only the dashed border is shown. Each plane can be independently set to one of the three modes. When one plane is in the active mode and another plane is in the inactive mode, a user can still see the part of the active plane that is behind the inactive plane and have a good sense of the 3D space.

The graphical interface is designed with the octant view occupying most of the window space and three icon images lying on the right hand side. The three icon images give user the traditional 2D slice views. They also serve as in-scene controls so that the user can click on an icon image to switch its display mode in the octant view. The positions of the icon images can be re-arranged according to application requirements.

The OV scene is initialized as looking at the origin from a distant point in the first octant. The coordinate system is the popular right-handed coordinate system with the Z-axis pointing upwards. The whole scene of the OV can be rotated using a mouse-dragging action, for example. The rotation angle of the z plane is preferably restricted to −60 to +60 degrees. This makes the z-axis always point upwards so that the user will not lose the sense of the 3D view after several rotations. However, the user can still see any parts of a 3D shape since the rotation angles can cover all of the desirable view directions, except small portions from the north and south poles, respectively. This design is consistent with many existing Computer Aided Design ("CAD") packages, which usually provide the user a "ground level" with which to work so that the user will not get disoriented in the 3D space.

One of the attractive features of the OV is that it is very easy to move or switch to other planes. This is especially useful in the livewire application. One can move to a plane that is parallel to the current active plane by grabbing a moving tab and dragging along a guiding bar. Low-resolution transient images are shown along with the dragging so that the user can know roughly where to stop. To switch to an image along a different axis, the user just needs to click on that plane. No other control needs to be invoked.

This interface emphasizes the following design features and advantages:

Reduced mouse travel distance: Many in-scene controls are provided, which make the interface more intuitive to operate and reduce a great deal of mouse traveling distance. When a user needs to work on an interface for a long period of time, reducing the unnecessary mouse movement increase productivity, reduces distraction, and improves human ergonomics.

Rich visual cues and feedback: Visual cues can provide the help to match the viewing dimension with the input device dimension. Since the octant view space is a 3D space, it has three degrees of freedom. The exemplary input device is an ordinary mouse, which has two degrees of freedom. By providing some visual cues such as a sliding bar, the movement can be limited to only one dimension, and both input and output devices can be matched to each other. With visual feedback, a user can also know exactly which state she is in and respond accordingly. Other visual feedback includes changing cursor shape to reflect the current feature. For example, the cursor can be changed to an hourglass if the user needs to wait. Progressive display results can also provide the user some clues about the status of the process.

Intuitive control: Intuitive control provides the user better manipulation of the interface. When the user wants to move the scene to the right, she simply moves the mouse to the right. When the user wants to move forward, she simply moves the mouse forward from herself. When the user wants to move backward, she will try to pull the mouse back and toward herself. The intuitive design matches the user's natural action to her intent. If this match is not met, a user might feel awkward in manipulation. Visual cues also have important impact to intuitive control. For example, if a sliding bar is presented to the user, running from the lower left corner to the upper right corner, the user will intuitively move the mouse in that diagonal fashion. The internal design matches this action to correctly reflect the activity on the screen.

In-scene control: The interface design lets the user do things in one scene, minimizing the travel distances of the mouse, and avoiding buttons or menu-clicking. In-scene graphical tabs are included for performing various tasks.

When the mouse cursor is moved over a graphical tab, its underlying functionality is changed to that particular graphical tab. This kind of design gives users a better visual realization of the current status of the cursor, and avoids back-and-forth mouse traveling in selecting different modes from a menu or task bar, for example. Thus, two triangle grabbing tabs are included on two opposite corners of a plane. When a cursor is clicked on the top of one of the tabs, a sliding bar appears, which guides the user by dragging along in restricted directions to translate the plane.

Although segmentation tools are usually applied in a 2D image that shows in a rectangle or square region on the screen, exemplary embodiments of the livewire tool lift this restriction and permit this plane to be in anywhere in the 3D space. With this arrangement, the livewire tool can be applied directly on a 2D image embedded in a 3D space. The basic segmentation working principle stays the same, but an extra transformation is used between the mouse position and the image coordinates. If a 2D image is treated as a plane in the 3D space, the intersection point is found of a ray originating from the mouse position to this plane.

Note that screen coordinates usually have a y-flip to the window coordinates due to the fact the origin of the screen coordinates is based on the top-left corner while the origin of the window coordinates of OpenGL are based on the lower-left corner. Given a viewing transformation matrix T that transforms a point from object coordinates into window coordinates, a window point $s_1$ (x, y), and the image plane Ax+By+Cz+D=O, the intersection point $p_3$ can be obtained by the following three steps: 1) Take a point $s_1$ (x, y, 0) in window coordinates, and do an inverse transformation to get its corresponding point $p_1$ in object coordinates: $p_1=T^{-1} \cdot s_1$. 2) Take another point $s_2$ (x, y, 1) to get $p_2$. 3) $p_3=p_1+k \cdot v$, where k is the distance from $p_1$ to $p_3$ and $v=p_2-p_1$.

The calculation of the distance k can be further simplified if the specific application deals only with planes that are orthogonal to one of the coordinate axes. For example, the plane equation orthogonal to the Z-axis is simplified to z+D=0. The distance k can be calculated by $k=-(D+p_1(z))/v(z)$.

Here, the translation from object coordinates to image coordinates is just a scale factor. Since the plane in the octant view coordinate is ranged from 0 to 1 in each side, the tool only needs to multiply the number of pixels along each side to get to the actual location of a pixel in the image.

The OV interface is developed using OpenGL, as known in the art. To achieve interactive speed of the livewire tool, pixel rectangle transfer operations are used instead of redrawing the whole scene during a livewire drawing session. The scene is fixed during the drawing session except for the changes of a piece of the livewire path. Thus, there is no need to redraw everything for this change. A copy of the whole image frame is kept before entering the livewire drawing session. The bounding box is tracked for the moving piece of the livewire. When an update is needed, the portion of the stored image frame inside the bounding box is copied back to the image frame buffer, the new piece of the livewire is drawn. This approach is more efficient, in general, than redrawing the whole scene.

A special drawing mode can be achieved in the octant view setting for livewire in two and a half dimensions ("2½D"). An octant view can be set up with two or three orthogonal images. This view is taken as a projected image and used as the working image for the livewire tool. After the boundaries of some regions of the projected image are outlined by the livewire tool, the boundary is back-projected to the 3D space. In this way, livewire draws the contours in different planes in a single drawing session.

Turning now to FIG. 3, an example demonstrating a livewire drawing session is indicated generally by the reference numeral 300. In this example, the representation of a femur bone is extracted from the data volume. This was no easy task in the past since ordinary image processing techniques, like thresholding or region growing, typically fail in this case. This is because there is no clear boundary at some area(s) where the femur bone is very close to the pelvis.

Figures 3A, 3B, 3C, 3D:
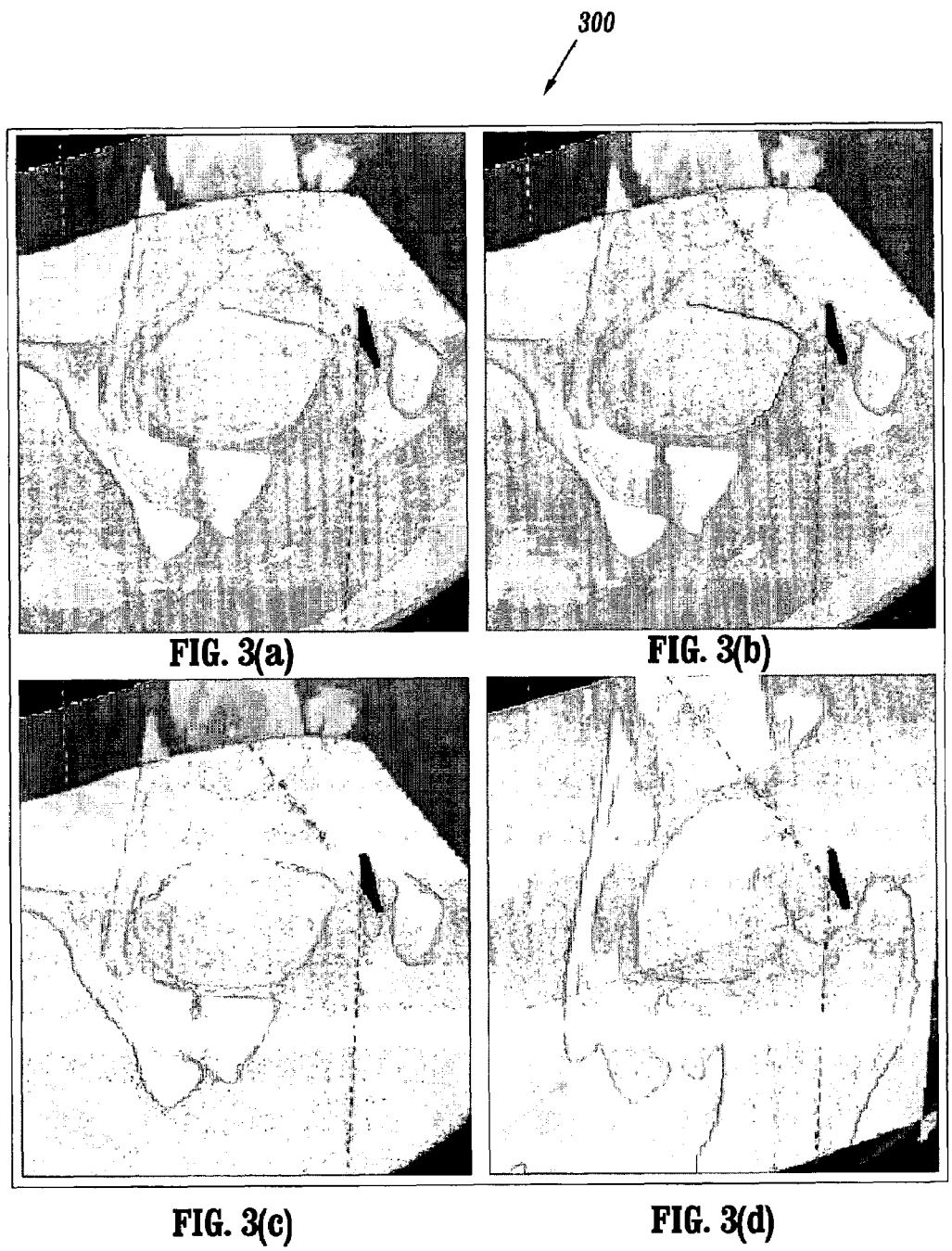
FIG. 3 shows graphical diagrams of 2D segmentation in accordance with FIG. 1.

FIG. 3(a) shows a livewire drawing session as started. The live path is indicated on the display screen in an orange color. FIG. 3(b) shows that one portion of the boundary is fixed, and this is indicated on the display screen in a purple color. FIG. 3(c) shows that one contour that is completed with just 3 clicks. FIG. 3(d) shows switching to a plane in the other axis. The new working plane becomes gray scale and the old working plane becomes transparent.

Figures 4E, 4F, 4G, 4H:
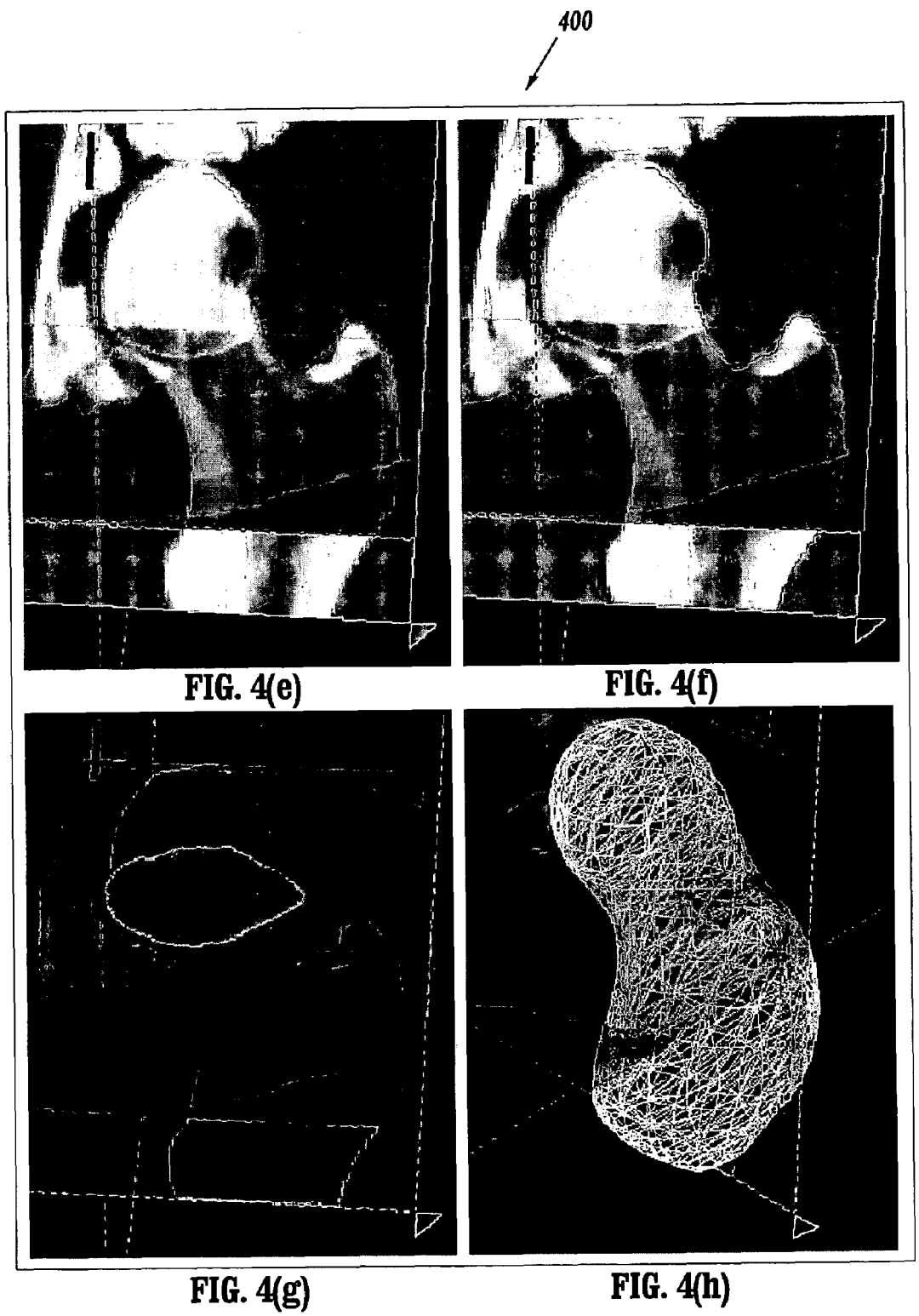
FIG. 4 shows graphical diagrams of 2D segmentation in accordance with FIG. 1.

Turning to FIG. 4, which continues the sequence of FIG. 3, the continued example demonstrating a livewire drawing session is indicated generally by the reference numeral 400. FIG. 4(e) shows that the scene is rotated to get a better angle for drawing on the new plane, and a new livewire drawing session is started. FIG. 4(f) shows one portion of the boundary that is fixed in the new plane. FIG. 4(g) shows two completed contours in 3D space after the planes are turned to transparent modes. In this example, the whole process took only about a minute and a half.

After extracting two orthogonal contours, a shape reconstruction algorithm is applied to obtain a rough approximation of the femur bone. FIG. 4(h) shows results in a wireframe format.

Figure 5I:
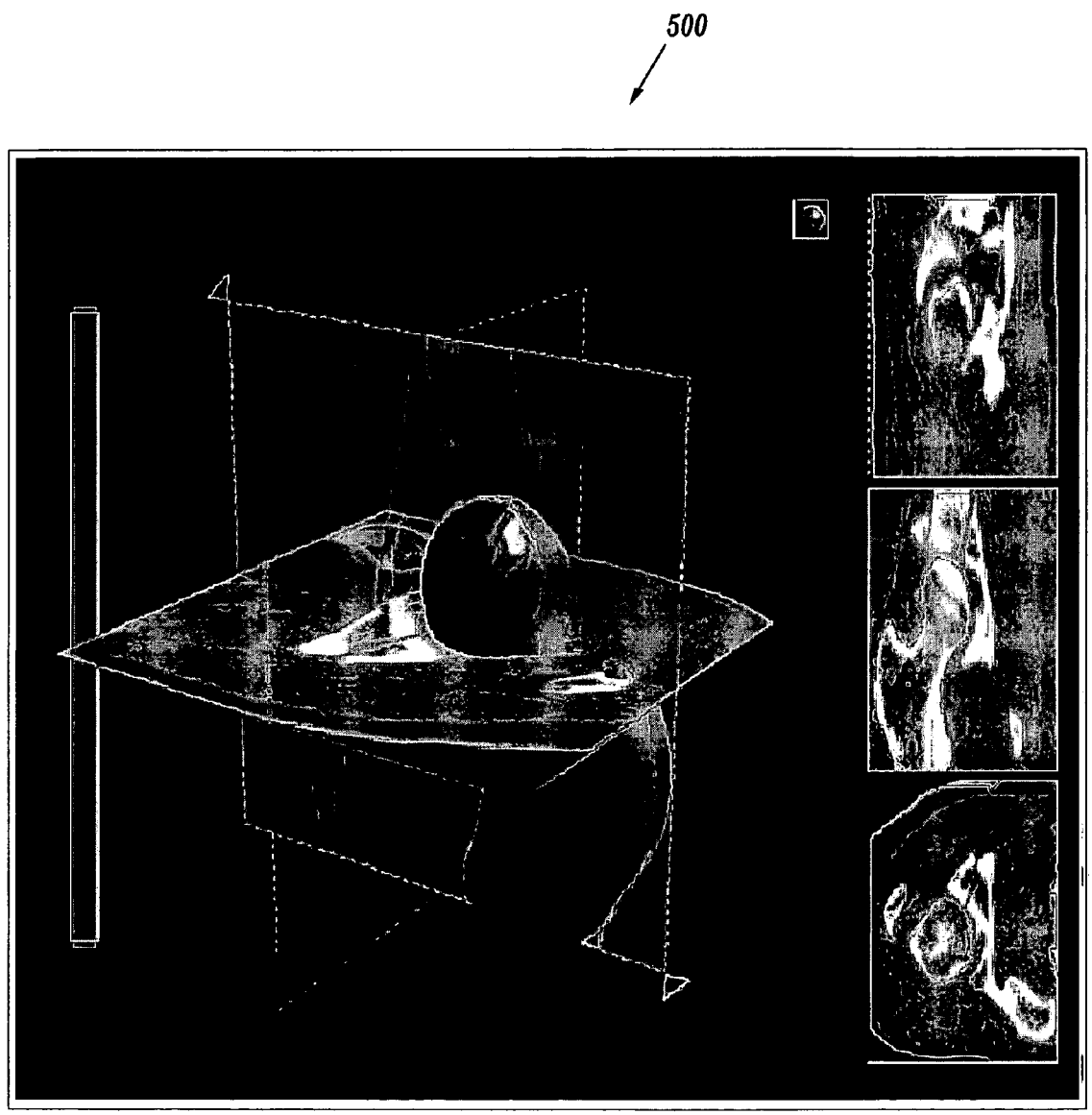
FIG. 5 shows a graphical diagram of 2D segmentation in accordance with FIG. 1.

Turning to FIG. 5, which continues the sequence of FIGS. 3 and 4, the continued example demonstrating a livewire drawing session is indicated generally by the reference numeral 500. FIG. 5(i) shows the session results in a surface shaded format.

As shown in FIG. 6, livewire action in the special 2½ D mode is indicated generally by the reference numeral 600. FIG. 6(a) displays a composite scene when the special drawing mode is turned on. Here, three gray scale images intersect each other. FIG. 6(b) shows that the livewire is drawn in this composite image. FIG. 6(c) shows the finished contour. FIG. 6(d) shows the angle turned to reveal that the contour is indeed a 3D contour.

Thus, embodiments of the present disclosure provide powerful 2D segmentation tools for applications in a 3D environment, enabling users to extract significant 3D features and 3D region-of-interest. Preferred embodiments can serve as very useful 3D editing tools in clinical applications.

The user interface is an important part of deploying clinical software, since the interface primarily determines whether the software will be utilized effectively. In designing a clinical user interface, a designer is well advised to consider that the software must conform to the physician's needs, not the other way around. The user interface must be intuitive and easy to learn. It is crucial that the user interface not burden the physician with the details of implementation.

One reason that the presently disclosed octant view is superior to prior existing medical application interfaces is that a better 2D/3D correlation is presented to the user. Many existing interfaces have several 2D-slice views requiring users to mentally construct their relationships to get the 3D picture. This task usually requires added training, and may require a deep learning curve. Instead, the present octant view presents a 3D view directly to the user, thereby obviating mental reconstruction by the user. With a visual representation already on the screen, users can release their minds from constructing a 3D scene and concentrate on other tasks, such as segmentation guidance.

These and other features and advantages of the present disclosure may be readily ascertained by one of ordinary skill in the pertinent art based on the teachings herein. It is to be understood that the teachings of the present disclosure may be implemented in various forms of hardware, software, firmware, special purpose processors, or combinations thereof.

Most preferably, the teachings of the present disclosure are implemented as a combination of hardware and software. Moreover, the software is preferably implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present disclosure is programmed. Given the teachings herein, one of ordinary skill in the pertinent art will be able to contemplate these and similar implementations or configurations of the present disclosure.

Although the illustrative embodiments have been described herein with reference to the accompanying drawings, it is to be understood that the present disclosure is not limited to those precise embodiments, and that various changes and modifications may be effected therein by one of ordinary skill in the pertinent art without departing from the scope or spirit of the present disclosure. All such changes and modifications are intended to be included within the scope of the present disclosure as set forth in the appended claims.

What is claimed is:

1. A method for image segmentation in a three-dimensional environment, the method comprising:
   a computer performing the following:
   receiving scan data as a plurality of original two-dimensional (2D) scans disposed with a scanning vector normal thereto;
   selecting an arbitrary viewing vector disposed non-parallel to the scanning vector;
   rendering the scan data as a 3D image about the viewing vector;
   displaying the rendered 3D image in an octant view on an output device;
   selecting a range of new 2D image slices with the arbitrary viewing vector disposed normal thereto from within the octant view of the 3D image;
   performing 2D segmentation on the selected slices to obtain a segmented 3D object; and
   displaying the segmented 3D object on the output device.

2. A method as defined in claim 1, further comprising performing in-scene control of slices within the 3D image by grabbing tabs on the 2D slice images within a rendered 3D image.

3. A method as defined in claim 2, further comprising providing sliding bars movable along restricted directions to guide the selection of slice ranges.

4. A method as defined in claim 1, the step of selecting a range of slices within the 3D image comprising selecting 2D image planes along different axis to be displayed within the rendered 3D scene.

5. A method as defined in claim 1, the step of performing 2D segmentation comprising determining the correspondence between a mouse point and the data within a 2D image in the 3D rendered image.

6. A method as defined in claim 5, the step of determining the correspondence comprising determining the intersection of the mouse point and the 2D slice image within the 3D scene by:
   receiving a mouse point in window coordinates;
   inverse transforming the mouse point to get its corresponding first point in object coordinates of the scan data;
   computing a second point along a straight vector from the first mouse point; and
   determining the intersection point as a function of the first point, a distance from the first point to the intersection point, and a vector obtained by subtracting the first point from the second point.

7. A method as defined in claim 1, the step of performing 2D segmentation comprising drawing the segmentation contours in a plurality of different planes in the rendered 3D image within a single drawing session.

8. A method as defined in claim 7, further comprising back-projecting the point coordinates of the segmentation contours within each 2D image plane to the 3D coordinate space.

9. A method as defined in claim 1, further comprising:
   selecting a second viewing vector relative to the rendered 3D image; and
   re-rendering the scan data as a 3D image about the second viewing vector.

10. A method as defined in claim 1, the step of performing 2D segmentation comprising:
    selecting an anchor point;
    transforming the anchor point from object coordinates into window coordinates; and
    determining an intersection of the anchor point with an image plane.

11. A method as defined in claim 1 wherein the scan data is produced by a medical imaging device.

12. A method as defined in claim 11 wherein the segmented 3D object is indicative of an organ.

13. A method as defined in claim 1, further comprising manually overriding a section of 2D segmentation disposed contiguously between two sections of automatic 2D segmentation.

14. An apparatus for image segmentation in a three-dimensional environment, the apparatus comprising:
    input means for receiving scan data as a plurality of original two-dimensional (2D) scans disposed with a scanning vector normal thereto;
    selection means coupled with the input means for selecting an arbitrary viewing vector disposed non-parallel to the scanning vector;
    rendering means coupled with the selection means for rendering the scan data as a 3D image about the viewing vector;

first display means coupled with the rendering means for displaying the rendered 3D image in an octant view;

ranging means coupled with the display means for selecting a range of new 2D image slices with the arbitrary viewing vector disposed normal thereto from within the octant view of the 3D image;

segmenting means coupled with the ranging means for performing 2D segmentation on the selected slices to obtain a segmented 3D object; and second display means coupled with the segmenting means for displaying the segmented 3D object.

15. An apparatus as defined in claim 14, further comprising control means for performing in-scene control of slices within the 3D image by grabbing tabs on the 2D slice images within a rendered 3D image.

16. An apparatus as defined in claim 15, further comprising guiding means for providing sliding bars movable along restricted directions to guide the selection of slice ranges.

17. An apparatus as defined in claim 14, the ranging means comprising selecting means for selecting 2D image planes along different axis to be displayed within the rendered 3D scene.

18. An apparatus as defined in claim 14, the segmenting means comprising mouse means for determining the correspondence between a mouse point and the data within a 2D image in the 3D rendered image.

19. An apparatus as defined in claim 18, the mouse means comprising intersecting means for determining the intersection of the mouse point and the 2D slice image within the 3D scene, including:
    window means for receiving a mouse point in window coordinates;
    inverse transforming means for inverse transforming the mouse point to get its corresponding first point in object coordinates of the scan data;
    vectoring means for computing a second point along a straight vector from the first mouse point; and
    function means for determining the intersection point as a function of the first point, a distance from the first point to the intersection point, and a vector obtained by subtracting the first point from the second point.

20. An apparatus as defined in claim 14, the segmenting means comprising drawing means for drawing the segmentation contours in a plurality of different planes in the rendered 3D image within a single drawing session.

21. An apparatus as defined in claim 20, further comprising back-projecting means for back-projecting the point coordinates of the segmentation contours within each 2D image plane to the 3D coordinate space.

22. An apparatus as defined in claim 14, further comprising:
    second selection means coupled with at least one of the first and second display means for selecting a second viewing vector relative to the rendered 3D image; and
    second rendering means coupled with the second selection means for re-rendering the scan data as a 3D image about the second viewing vector.

23. An apparatus as defined in claim 14, the segmenting means for performing 2D segmentation comprising:
    anchoring means coupled with segmentation means to detect feature contours within the 2D image in the 3D scene
    intersection means for determining the mouse coordinate correspondence with the 2D image plane
    transforming means for converting the detected feature contour to windows coordinates for display in the 3D scene.

24. An apparatus as defined in claim 14, further comprising a medical imaging device for producing the scan data.

25. An apparatus as defined in claim 24 wherein the segmented 3D object is indicative of an organ.

26. An apparatus as defined in claim 14, further comprising manual override means performing coupled with the segmenting means for providing manually overridden 2D segmentation disposed contiguously between two sections of automatic 2D segmentation.

27. A computer-readable medium tangibly embodying a program of instructions executable by a machine to perform program steps for image segmentation in a three-dimensional environment, the program steps comprising:
    receiving scan data as a plurality of original two-dimensional (2D) scans disposed with a scanning vector normal thereto;
    selecting an arbitrary viewing vector disposed non-parallel to the scanning vector;
    rendering the scan data as a 3D image about the viewing vector;
    displaying the rendered 3D image in an octant view;
    selecting a range of new 2D image slices with the arbitrary viewing vector disposed normal thereto from within the octant view of the 3D image;
    performing 2D segmentation on the selected slices to obtain a segmented 3D object; and
    displaying the segmented 3D object.

28. A computer-readable medium as defined in claim 27, the program steps further comprising performing in-scene control of slices within the 3D image by grabbing tabs on the 2D slice images within a rendered 3D image.

29. A computer-readable medium as defined in claim 28, the program steps further comprising providing sliding bars movable along restricted directions to guide the selection of slice ranges.

30. A computer-readable medium as defined in claim 27, the program step of selecting a range of slices within the 3D image comprising selecting 2D image planes along different axis to be displayed within the rendered 3D scene.

31. A computer-readable medium as defined in claim 27, the program step of performing 2D segmentation comprising determining the correspondence between a mouse point and the data within a 2D image in the 3D rendered image.

32. A computer-readable medium as defined in claim 31, the program step of determining the correspondence comprising determining the intersection of the mouse point and the 2D slice image within the 3D scene by the program steps of:
    receiving a mouse point in window coordinates;
    inverse transforming the mouse point to get its corresponding first point in object coordinates of the scan data;
    computing a second point along a straight vector from the first mouse point; and
    determining the intersection point as a function of the first point, a distance from the first point to the intersection point, and a vector obtained by subtracting the first point from the second point.

33. A computer-readable medium as defined in claim 27, the program step of performing 2D segmentation comprising drawing the segmentation contours in a plurality of different planes in the rendered 3D image within a single drawing session.

34. A computer-readable medium as defined in claim 33, further comprising the program step of back-projecting the point coordinates of the segmentation contours within each 2D image plane to the 3D coordinate space.

35. A computer-readable medium as defined in claim 27, the program steps further comprising:
   selecting a second viewing vector relative to the rendered 3D image; and
   re-rendering the scan data as a 3D image about the second viewing vector.

36. A computer-readable medium as defined in claim 27, the program step of performing 2D segmentation comprising:
   selecting an anchor point;
   transforming the anchor point from object coordinates into window coordinates; and
   determining an intersection of the anchor point with an image plane.

37. A computer-readable medium as defined in claim 27 wherein the scan data is produced by a medical imaging device.

38. A computer-readable medium as defined in claim 37 wherein the segmented 3D object is indicative of an organ.

39. A computer-readable medium as defined in claim 27, the program steps further comprising the step of performing manually overridden 2D segmentation disposed contiguously between two sections of automatic 2D segmentation.

40. A method as defined in claim 1 wherein the selected arbitrary viewing vector is disposed non-normal and non-coincident relative to the original 2D scans.

* * * * *